United States Patent Office 3,453,344
Patented July 1, 1969

3,453,344
METHOD OF PRODUCING DIOLEFIN HYDROCARBONS
Vagab Safarovich Aliev, Adilya Khanum Panakh-Kyzy Kasimova, and Beniamin Georgievich Ter-Sarkisov, all of Baku, U.S.S.R.
No Drawing. Filed Mar. 6, 1967, Ser. No. 620,677
Int. Cl. C07c *11/02;* B01j *11/06*
U.S. Cl. 260—680  3 Claims

ABSTRACT OF THE DISCLOSURE

A method of producing diolefins from olefins by dehydrogenation in the presence of $O_2$ and steam and a catalyst containing 20–30% $Fe_2O_3$, 35–50% $Cr_2O_3$, 20–25% ZnO and 1.5–2.0% $K_2O$.

---

The present invention relates to methods of producing diolefin hydrocarbons, more particularly diolefin containing four or five carbon atoms, which are useful as starting materials in the manufacture of divinyl-styrene and isoprene rubbers.

Several methods of producing diolefin hydrocarbons are known.

The Hondry process for diolefin production comprises an adiabatic olefin dehydrogenation process using a chromia-alumina catalyst under subatmospheric pressures.

Disadvantages associated with this method are that it is a batch process, and that it gives a low yield of product diolefin, i.e., not more than 12–13% by weight of the cycled raw material and results in 55–57% of the raw material being consumed. Another disadvantage is the low coefficient of efficiency of the reaction volume as a consequence of operation under vacuum, which in turn makes it impossible to organize the large-scale production of diolefin.

Another known method of producing diolefin comprises the dehydrogenation of olefin hydrocarbons under adiabatic conditions over chrome-iron catalysts (e.g. catalyst No. 1707) or a calcium-nickel-phosphate catalyst (as proposed by Dow Chemical) with the subsequent recovery of the diolefin formed and recycling of the unreacted olefins.

The method of dehydrogenating olefine hydrocarbons over chrome-iron catalysts suffers from the following disadvantages: the batch nature of the process, comprising a 4–6 hour dehydrogenation cycle followed by a 1–1.5 hr. cycle of catalyst regeneration; the plurality of units required; a high heat consumption as a consequence of the use of superheated steam at a temperature of 720–740° C. as a heat carrier; low yield of diolefines per pass (up to 15–16% by weight), the selectivity of the process being 74–76% by weight, thus necessitating recycling of the unreacted raw material 5 or 6 times; vertical temperature inconstancy in relation to catalyst (temperature gradient between beginning and end of reaction is of the order of 50–60° C.).

Although the method of producing diolefin hydrocarbons over a calcium-nickel-phosphate catalyst gives a higher yield of diolefins on the basis of the cycled raw material (of the order of 30–33%), the selectivity of the process being 80–82%, it has the following disadvantages: high heat consumption as a consequence of the use of superheated steam at a temperature of 720–740° C. as a heat carrier, as well as a high steam consumption, amounting to 20 mols of water per mol of olefine; short cycles of reaction and regeneration (15 min.) necessitating special switching devices; costliness and rapid deterioration of the catalyst; high consumption and crumbling of catalyst due to its fragility.

It is also known to produce diolefin hydrocarbons by dehydrogenating olefins in the presence of oxygen over a bismuth-phosphorus-molybdenum catalyst at a reaction temperature of 420–520° C. (U.S. Patent 2,991,321).

Among the disadvantages of this method are: the high consumption of oxygen, amounting to form 1.5 to 2.5 mols of oxygen per mol of olefine, and the high content (from 5 to 15%) of oxygen-containing compounds and furan in the contact gas. The excess of oxygen (from 2 to 5%) in the contact gas is necessary to prevent deactivation of the catalyst.

It is an object of the present invention to provide a continuous method of dehydrogenating olefin hydrocarbons.

It is another object of the invention to provide a method making it possible to increase the product yield.

It is still another object of the invention to provide a cheap and available catalyst.

The foregoing and additional objects have been accomplished by carrying out the process of oxidative dehydrogenation of olefin hydrocarbons in the presence of steam and oxygen under adiabatic conditions over a catalyst which, according to the invention, consists of $Fe_2O_3$, 20–30% by weight, $Cr_2O_3$ 35–50% by weight, ZnO, 20–25% by weight and 1.5–2% by weight of $K_2O$ promoter.

A preferred embodiment of the invention contemplates an oxygen to olefin ratio of 0.3 to 1.0, oxygen being fed into the reactor both over the catalyst and directly into the layer of catalyst at different points, depending on the thickness of said layer.

The process is carried out in the following way: the starting material—olefin hydrocarbons—mixed with steam is fed into the top of the reactor at an appropriate volume flow rate; passing downward, the olefins, diluted with steam, mix with oxygen which is fed into the reactor over the catalyst or into the layer of catalyst at several points, depending on the thickness of said layer. In the reactor, the olefins in the presence of oxygen and steam are subjected to oxidizing dehydrogenation under isothermic conditions. The reaction products (contact gas) leaving the layer of catalyst are passed from the bottom of the reactor through a condenser-cooling system for separation into product diolefin, olefins which are recycled for dehydrogenation, and volatile components containing up to 4 carbon atoms.

The present invention makes it possible to carry out the process continuously in a stationary-type reactor without regeneration of the catalyst since autoregeneration of the catalyst takes place simultaneously during the process of dehydrogenation.

The invention makes it possible to carry out the process of oxidizing dehydrogenation under isothermic conditions conducive to achieving high yields of diolefin hydrocarbons (divinyl or isoprene); 36–40% by weight per pass, with high selectivity of the process (82–86%).

The present method enables a reduction in heat consumption since the diluent employed for lowering the partial pressure of the olefins during the dehydrogenation reaction is steam at a temperature not higher than 600° C.

The oxygen employed for the oxidizing dehydrogenation reaction is consumed not only in regenerating the catalyst by freeing it of coke deposits but also in combining with the hydrogen, in this way shifting the equilibrium of the dehydrogenation reaction toward a higher concentration of diolefins in the contact gas.

In the contact gas there is a disproportion between the volume content of diolefins and hydrogen:

$$\frac{\text{percent diolefine by vol.}}{\text{percent hydrogen by vol.}}$$

In addition the present method ensures reduction of the content of oxygen-containing compounds in the contact gas to 0.2–0.3% by weight.

The present method ensures a 30–50% reduction in the cost of product diolefin as compared to the cost price of diolefin produced with a chrome-iron catalyst (without oxygen).

Incorporation of the present process into the synthetic rubber industry does not require the designing of complicated new apparatus; the process may be achieved through partial reconstruction of operating adiabatic reactors for the dehydrogenation of olefins without oxygen.

For a better understanding of the present invention by those skilled in the art, the following examples are given by way of illustration.

EXAMPLE 1

Production of divinyl by oxidizing dehydrogenation of butylenes.

A reactor is charged with a catalyst containing 24% $Fe_2O_3$, 50% $Cr_2O_3$, 25% ZnO and 1% $K_2O$, and the starting material containing 81.5–82.5% butylenes by weight is fed in.

Reaction conditions: Temperature 585–600° C. Feed rate of butylenes 500 v./v./hr., at molar ratio of steam to butylenes of 10:1, or 800 v./v./hr. at molar ratio of steam to butylenes of 20:1.

Molar ratio of oxygen to butylene fraction 0.5–1:1. When the catalyst layer is 0.5 m. deep and the molar ratio of steam of butylenes is 20:1, the oxygen is fed into the reactor above the catalyst. When the catalyst layer is 1.0 m. deep and the molar ratio of steam to butylenes is 10:1, the oxygen is fed into the reactor above the catalyst and in addition into the layer of catalyst at two points.

The specified conditions ensure yields of divinyl, percent by weight:

(a) On basis of cycled butylenes _____ 36–40
(b) On basis of consumed butylenes _____ 82–85

Amount of oxygen-containing compounds in contact gas, percent by weight 0.2–0.3.

EXAMPLE 2

Production of isoprene by oxidizing dehydrogenation of isoamylenes.

The reactor is charged with a catalyst containing 24% $Fe_2O_3$, 50% $Cr_2O_3$, 25% ZnO and 1% $K_2O$, and the starting material containing 81–85% isoamylenes is fed in.

Reaction conditions: Temperature 575–590° C. Feed rate of isoamylenes 500 v./v./hr. at molar ratio of steam to isoamylenes of 10:1, or 800 v./v./hr. at molar ratio of steam to isoamylenes of 20:1.

Molar ratio of oxygen to isoamylenes 0.6–1.1. When the catalyst layer is 0.5 m. deep and the molar ratio of steam to isoamylenes is 20:1, the oxygen is fed into reactor above the catalyst. When the catalyst layer is 1.0 m. deep and the molar ratio of steam to isoamylenes is 10:1, the oxygen is fed into the reactor above the catalyst and in addition into the layer of catalyst at two points.

The specified conditions ensure yields of isoprene, percent by weight:

(a) On basis of cycled isoamylenes _____ 36–40
(b) On basis of consumed isoamylenes ____ 80

Amount of oxygen-containing compounds in contact gas, percent by weight 0.3–0.4.

What is claimed is:

1. A method of producing diolefin hydrocarbons from olefin hydrocarbons by dehydrogenation of said olefin hydrocarbons under adiabatic conditions in the presence of steam and oxygen over a catalyst containing 20–30% by weight of $Fe_2O_3$, 35–50% by weight of $Cr_2O_3$, 20–25% by weight of ZnO and 1.5–2.0% by weight of $K_2O$.

2. A method as claimed in claim 1, wherein the molar ratio of oxygen to olefin hydrocarbons is 0.3–1:1.

3. A method as claimed in claim 1, wherein oxygen is fed directly into the catalyst at different points.

References Cited

UNITED STATES PATENTS

| | | | |
|---|---|---|---|
| 2,370,797 | 3/1945 | Kearby | 260—680 X |
| 2,461,147 | 2/1949 | Davies et al. | 260—680 |
| 3,308,181 | 3/1967 | Pitzer | 260—680 |
| 3,361,683 | 1/1968 | Gutmann | 260—680 X |

PAUL M. COUGHLAN, JR., *Primary Examiner.*

U.S. Cl. X.R.

252—468